Figures 1, 2:
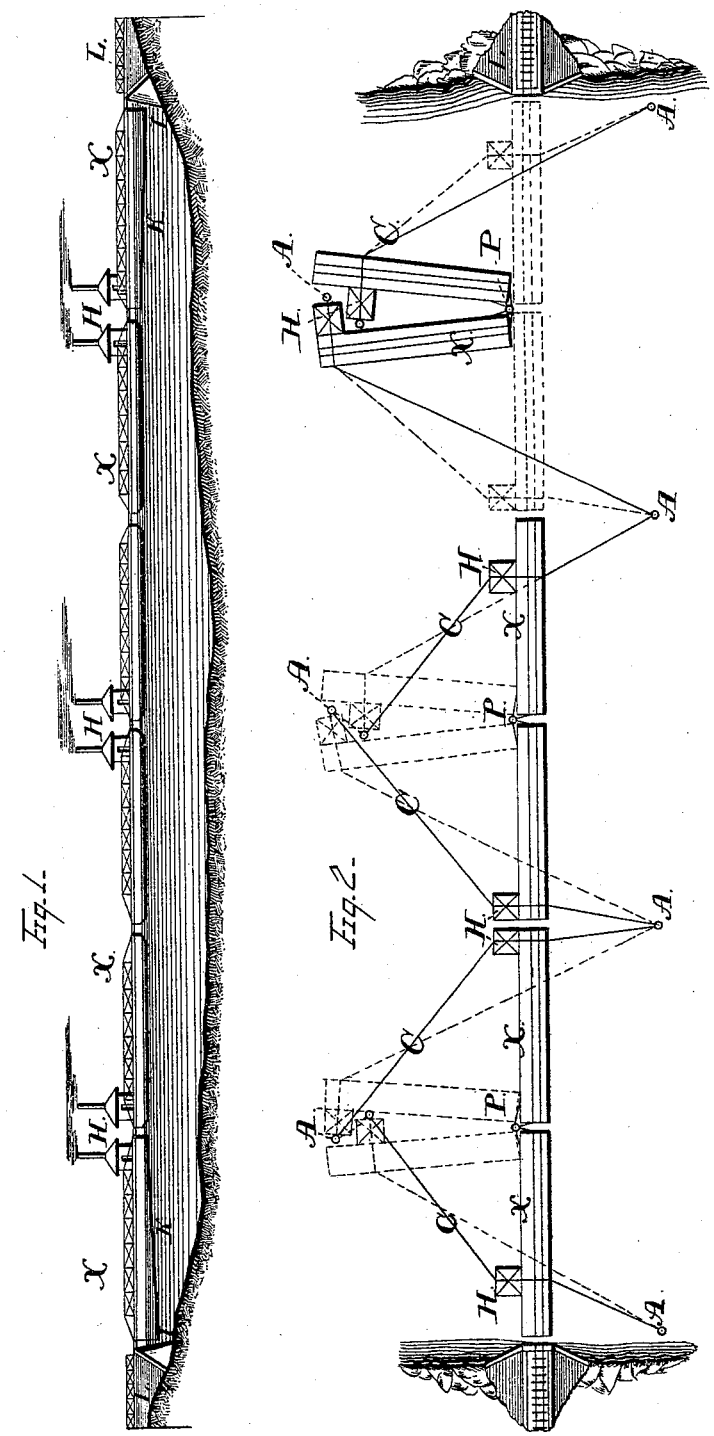

3 Sheets—Sheet 1.

H. H. GORRINGE.
FLOATING DRAW-BRIDGE.

No. 171,722. Patented Jan. 4, 1876.

WITNESSES

INVENTOR
Henry H. Gorringe

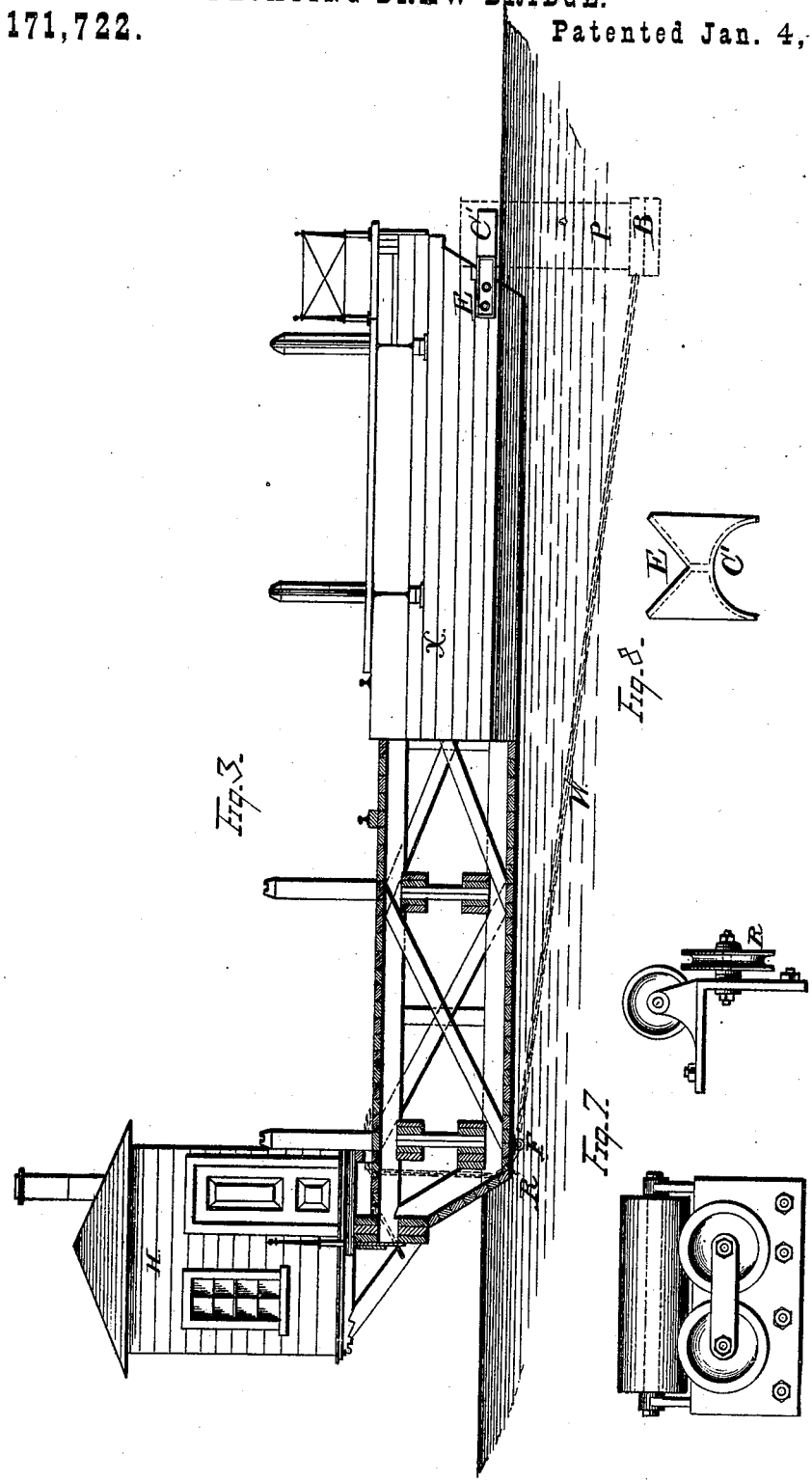

3 Sheets—Sheet 3.
H. H. GORRINGE.
FLOATING DRAW-BRIDGE.
No. 171,722. Patented Jan. 4, 1876.
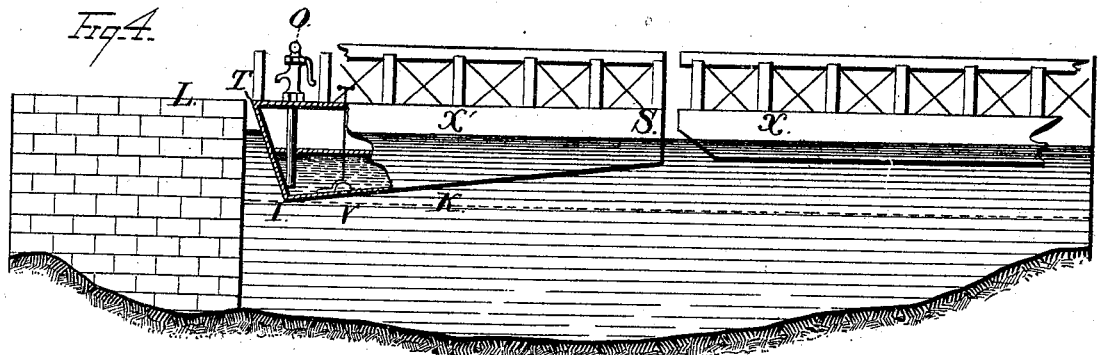
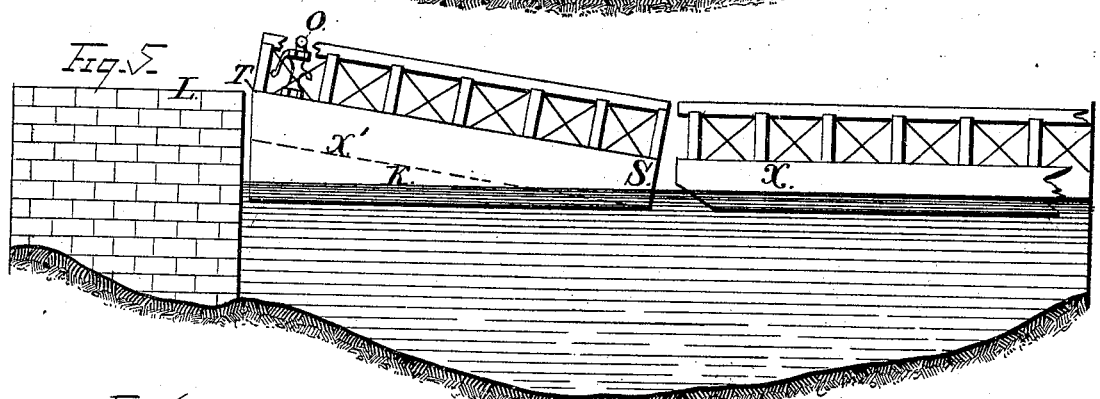
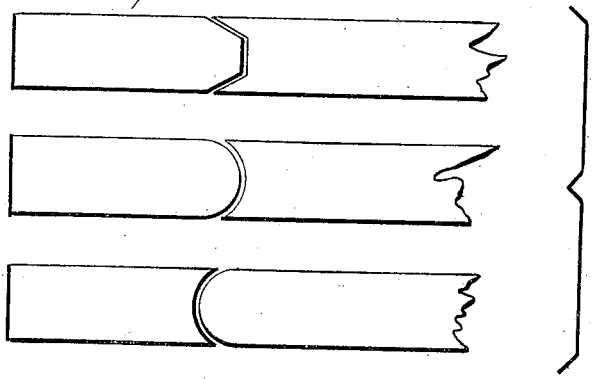
WITNESSES
INVENTOR
Harry H. Gorringe

UNITED STATES PATENT OFFICE.

HENRY H. GORRINGE, OF WASHINGTON, DISTRICT OF COLUMBIA, ASSIGNOR OF ONE-FOURTH HIS RIGHT TO J. B. GORRINGE, OF SAME PLACE.

IMPROVEMENT IN FLOATING DRAW-BRIDGES.

Specification forming part of Letters Patent No. 171,722, dated January 4, 1876; application filed December 13, 1875.

*To all whom it may concern:*

Be it known that I, HENRY H. GORRINGE, of Washington, in the District of Columbia, have invented certain new and useful Improvements in Floating Draw-Bridges, which improvements are fully set forth in the following specification, reference being had to the accompanying drawings.

My invention relates to an improvement in floating draw-bridges, more especially in the method of arranging and securing the floats, and providing for the rise and fall of tides and rivers. It is adapted to navigable waters of every description over which fixed bridges, or those in part fixed and in part floating, would be objectionable for any cause whatever. It is especially adapted to railroad-crossings at localities where any obstruction in the river, &c., would be against the interest of navigation, and to tidal waters where changes of level are of constant or frequent occurrence.

In the drawings, Figure 1 is a side elevation. Fig. 2 is a plan, showing one pair of floats thrown open. Fig. 3 is a half-section and elevation of one float, showing the method of securing and pivoting it. Fig. 4 is a side elevation, showing my adjustable approach operating at high water; Fig. 5, the same at low water. Fig. 6 represents a plan view of three modifications of my method of joining the end float to the abutment. Fig. 7 represents a chain-guide in plan and elevation. Fig. 8 shows in plan the crutch shown in elevation in Fig. 3.

My invention consists of the following parts and combinations: X are floats of any suitable dimensions and construction. P are pivots, consisting of iron or wooden piles. A are anchor-piles, screwed into the river-bed, so that the top will be flush with the surface of the bottom. C are chain-cables, the ends of which are secured to the anchor-piles A after passing around the drum of a windlass situated on the end of the floats. H are engine-houses, containing suitable machinery for revolving the windlass. In Fig. 3, E C' is a bearing, one end of which is angular, the other end curved. The angular end is bolted to the edge of the float; the circular end clasps the pivot-pile, so as to permit free vertical motion. B is a band, secured to the pivot at any suitable depth below low-water level, so that the bottom of the float will not rest on the chain W when the water has reached its lowest stage. To the band B is secured one end of the chain W; the other end is secured to the opposite edge of the float, or reeved through a sheave, and thence carried on deck to be made fast. The position of the eyebolt F or sheave R is such that the chain W makes an angle with the end of the float X.

In localities where there is but a small difference between high and low water levels, it would not be necessary to use a sheave, as there would be little difference in the length of the chain W at any stage of tide.

In Figs. 4 and 5, X' is a float of suitable dimensions, constructed with an angular or inclined bottom, K, and an angular or curved end, I. L represents a permanent landing, such as a wharf or a fixed approach to a bridge, or any other stationary structure. The end I of the float X' is so inclined as to permit motion in arc of the lower extremity without collision with the abutment.

The float X' may be either a single compartment, or may be divided into two or more compartments, as shown in the drawings.

At or near the bottom of the float X' is placed a valve, V, of any suitable construction, which, when opened, will admit water into the float. O is a pump for emptying water from the float X', or any of its compartments. The extremity S of the float X' may be adjusted to any floating body by any suitable device.

The operation is as follows: The floats X and X' having been secured to the pivots P, in the manner set forth, and the swinging ends having been moored to the anchor-piles A, as heretofore described, the ends are brought together and connected by any suitable device, so as to form a continuous roadway across a river or other navigable water. When it is desired to open the bridge, so as to permit the passage of vessels, &c., the windlass is revolved by means of the machinery attached, so as to swing the turning end of the float, bringing it perpendicular to the direction of the bridge. As shown in Fig. 2, this operation may be performed with either or with all of the floats, thus practically throwing open any part or the whole width of the river for purposes of navigation. When it is desired to close the bridge to form a roadway, the windlass is revolved in an opposite direction, bringing the float or floats in line.

A float constructed after the pattern of X' would, if empty, assume the position shown in Fig. 5, the deck forming an angle with the water-line. If the angular compartment were full of water, it would assume the position shown in Fig. 4—the deck parallel with the water-line. Therefore it is evident that, by admitting water into or pumping it from the compartment, the end T of the float X' may be kept on a level with the abutment L, while the end S of the float X' remains on the same level as the end of the adjacent float X. Thus an easily-adjusted apron is provided for the transit of trains or other bodies in motion from a fixed to a varying plane.

I claim as my invention—

1. A number of floats of suitable dimensions and construction, secured in pairs or singly to pivots screwed or driven into the river-bed, and moored to anchors placed in suitable positions in the river-bed, so that they will form a continuous roadway across a river or other navigable water, and open at any or all points to permit the free passage of vessels without confining them to one draw-opening, or any particular channel or locality, substantially as described.

2. The floating approach or hull X', provided with an inclined or angular bottom, K, and an inclined or angular end, I, either or both, substantially as and for the purpose shown.

3. In combination with the crutch or bearing E C, the chain W, secured to the pivot P and eyebolt F, or reeved through a sheave and secured on the deck of the float X, substantially as and for the purpose shown.

4. In combination with the floats X, pivots P, anchors A, chains C, the end floats X', and the bearing and chain E, C, and W, substantially as and for the purpose shown.

HENRY H. GORRINGE.

Witnesses:
THOMAS C. CONNOLLY,
WARREN I. COLLAMER.